(12) United States Patent
Washizawa

(10) Patent No.: US 7,856,466 B2
(45) Date of Patent: Dec. 21, 2010

(54) INFORMATION PROCESSING APPARATUS AND METHOD FOR SOLVING SIMULTANEOUS LINEAR EQUATIONS

(75) Inventor: Teruyoshi Washizawa, Atsugi (JP)

(73) Assignee: Canon Kabushiki Kaisha, Tokyo (JP)

(*) Notice: Subject to any disclaimer, the term of this patent is extended or adjusted under 35 U.S.C. 154(b) by 1174 days.

(21) Appl. No.: 11/300,494

(22) Filed: Dec. 14, 2005

(65) Prior Publication Data
US 2006/0129351 A1    Jun. 15, 2006

(30) Foreign Application Priority Data
Dec. 15, 2004   (JP)   ............... 2004-363677

(51) Int. Cl.
  G06F 7/38   (2006.01)
(52) U.S. Cl. .................................. 708/446
(58) Field of Classification Search ......... 708/800–804, 708/446; 702/179; 703/12–16
See application file for complete search history.

(56) References Cited

U.S. PATENT DOCUMENTS 6,144,932 A * 11/2000 Hachiya ............... 703/14

FOREIGN PATENT DOCUMENTS

| JP | 05-073527 A | 3/1993 |
|----|-------------|--------|
| JP | 11-242664 A | 9/1999 |

OTHER PUBLICATIONS

"The application of the generalized conjugate residual algorithm to accelerate the fast multipole method", Ning Yuan et al., 2001, p. 778-781.*
"Solving linear algebraic equations can be interesting", George Forsythe, 2002, p. 313-329.*
"On the Behavior of the Conjugate Residual Method for Singular Systems", Ken Hayami, 2001, p. 1-15.*
Hayami, "On the Behaviour of the Conjugate Residual Method for Singular Systems," NII Technical Report, NII-2001-002E (2002), 15 pages.
Abe et al., "Convergence Theory of the CR Method for Linear Singular Systems," The Japan Society for Industrial and Applied Mathematics, vol. 9, No. 1, 1999, pp. 1-13.

* cited by examiner

*Primary Examiner*—Lewis A Bullock, Jr.
*Assistant Examiner*—Kevin Hughes
(74) *Attorney, Agent, or Firm*—Canon U.S.A., Inc. I.P. Division

(57) ABSTRACT

First, calculations to solve a given set of simultaneous linear equations are performed using a conjugate gradient method and it is determined, each time the calculations are iterated, whether or not the calculations diverge. If it is determined that the calculations diverge, the initial value of a variable is set to the minimum value and calculations to solve the set of simultaneous linear equations are performed using a conjugate residual method. This allows the set of simultaneous linear equations to be solved even if it is not known whether or not its coefficient matrix is regular.

9 Claims, 6 Drawing Sheets

INFORMATION PROCESSING APPARATUS AND METHOD FOR SOLVING SIMULTANEOUS LINEAR EQUATIONS

BACKGROUND OF THE INVENTION

1. Field of the Invention

The present invention relates to calculation techniques for solving simultaneous linear equations.

2. Description of the Related Art

It is known that many problems to be solved in a variety of fields are reduced down to simultaneous linear equations by discrete approximation methods or the like.

Such simultaneous linear equations usually have regular coefficient matrices, and thus can be solved by Gaussian elimination. If a coefficient matrix is large and sparse, iterative methods, such as the Jacobi method and the Gauss-Seidel iteration method, and a conjugate gradient method (hereinafter abbreviated as "CG method") are known to be effective (see, Mori, Sugihara, and Murota: "Numerical calculations (in Japanese)," Iwanami Koza Oyo Sugaku [Hoho 2], Iwanami Shoten (1994)). The following techniques are disclosed since the specifications of calculators and the speed of calculation vary depending on which solution method is selected to solve the problem.

Japanese Patent Laid-Open No. 05-073527 discloses a method in which one of either a direct method or an iterative method is selected to solve a set of simultaneous linear equations, depending on whether or not its matrix is sparse and whether or not the frequency of a power source is below a predetermined parameter. This Japanese Patent Laid-Open No. 05-073527 states that the disclosed method allows the selection of the best solution method according to the amount of memory.

Japanese Patent Laid-Open No. 11-242664 discloses a method that involves a step of estimating the time required for solving a problem and allows the best solution method to be selected, on the basis of the estimated time, from a plurality of trigonometric resolution methods available for matrices. This Japanese Patent Laid-Open No. 11-242664 states that the disclosed method enables a given problem to be solved at the highest speed.

However, there are cases where a coefficient matrix is singular, depending on the problem to be solved. In such cases, the Gauss method, which is a type of a direct method, and a series of iterative methods based on the Jacobi method fail.

On the other hand, it is known that if certain conditions are met, the CG method can give a solution even if a coefficient matrix is singular (see, E. F. Kaasschieter: "Preconditioned conjugate gradients for solving singular systems," Journal of Computational and Applied Mathematics, 24, pp. 265-275 (1988)). It is also known that even in the case where the CG method fails, a conjugate residual method (hereinafter abbreviated as "CR method") does not fail and converges to the optimal solution (see, Abe, Ogata, Sugihara, Zhang, and Mitsui: "Convergence of CR method for simultaneous linear equations with singular coefficient matrices (in Japanese)," Transactions of the Japan Society for Industrial and Applied Mathematics, Vol. 9, No. 1, pp. 1-13 (1999)).

To sum up, when a coefficient matrix is regular, direct methods, iterative methods, the CG method, and the CR method are all effective. When a coefficient matrix is singular, the CG method and the CR method are effective if certain conditions are met, and otherwise only the CR method is effective.

However, since solution methods vary depending on whether the coefficient matrix is regular or singular, a solution method for simultaneous linear equations cannot be determined in advance if it is not known whether or not the coefficient matrix of the equations to be solved is regular.

SUMMARY OF THE INVENTION

In view of the problems described above, the present invention provides calculation techniques for solving simultaneous linear equations when it is not known whether the coefficient matrix thereof is regular.

According to one aspect of the present invention, an information processing apparatus includes: a first calculating unit configured to perform calculations based on a first calculating method for obtaining solution data of a given set of simultaneous linear equations; a determining unit configured to determine, based on resulting data obtained each time the first calculating unit iterates the calculations, whether the calculations diverge; and a second calculating unit configured to perform calculations, instead of the calculations performed by the first calculating method, based on a second calculating method for obtaining the solution data of the given set of simultaneous linear equations, if the determining unit determines that the calculations performed by the first calculating unit diverge.

According to another aspect of the present invention, an information processing method includes: a first calculating step of performing calculations based on a first calculating method for obtaining the solution data of a given set of simultaneous linear equations; a determining step of determining, based on resulting data obtained each time the calculations are iterated in the first calculating step, whether the calculations diverge; and a second calculating step of performing calculations, instead of the calculations performed in the first calculating step, based on a second calculating method for obtaining the solution data of the given set of simultaneous linear equations, if it is determined in the determining step that the calculations performed in the first calculating step diverge.

Further features of the present invention will become apparent from the following description of exemplary embodiments with reference to the attached drawings.

DESCRIPTION OF THE EMBODIMENTS

An embodiment of the present invention will now be described in detail with reference to the attached drawings.

Figure 2:
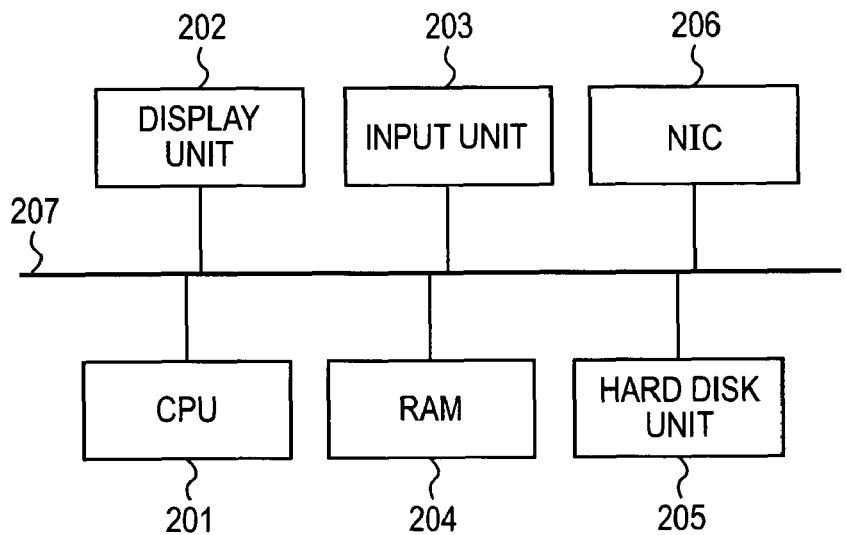
FIG. 2 is a block diagram showing an exemplary basic configuration of the computer functioning as an information processing apparatus of the embodiment.

FIG. 2 is a block diagram showing an exemplary basic configuration of a computer functioning as an information processing apparatus of the present embodiment.

A central processing unit (CPU) 201 performs each operation described below while controlling the information processing apparatus using programs and data stored in a random-access memory (RAM) 204.

A display unit 202 includes a cathode-ray tube (CRT) or a liquid crystal screen and is capable of displaying the results of processing by the CPU 201 with text and graphics.

An input unit 203 includes operation devices, such as a keyboard and a mouse, and inputs various commands to the CPU 201.

The RAM 204 not only provides an area for temporarily storing programs and data loaded from a hard disk unit 205, but also provides a work area required for the CPU 201 to execute various operations.

The hard disk unit 205 stores programs and data for having the CPU 201 and operating system (OS) execute each operation described below. All or part of these programs and data are loaded to the RAM 204 under the control of the CPU 201.

A network interface card (NIC) 206 functions as an interface that allows data communication with external devices. The computer of the present embodiment sends and receives programs and data through the NIC 206 to and from external devices. The CPU 201 may process programs and data received from the external devices through the NIC 206 instead of programs and data stored on the hard disk unit 205.

A bus 207 connects all the components described above.

The following describes numerical calculations performed by the computer having the above-described configuration to solve simultaneous linear equations.

Figure 1:
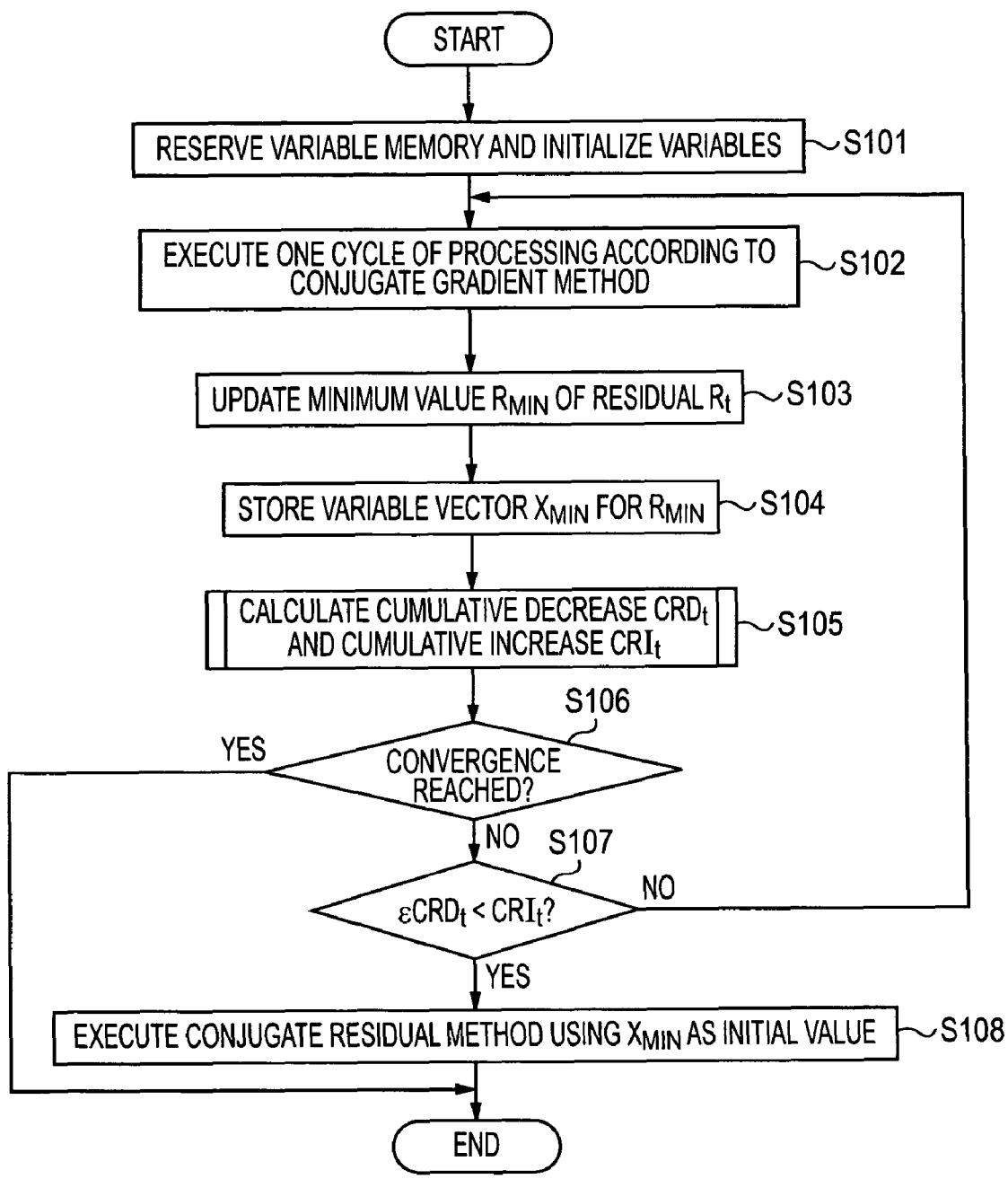
FIG. 1 is a flowchart showing exemplary numerical calculations performed by a computer of an embodiment to solve a set of simultaneous linear equations.

FIG. 1 is a flowchart showing exemplary numerical calculations performed by the computer of the present embodiment to solve a set of simultaneous linear equations. Programs and data for having the CPU 201 execute processing according to the flowchart in FIG. 1 are stored on the hard disk unit 205, loaded to the RAM 204 under the control of the CPU 201, and used by the CPU 201 to perform processing. This causes the computer of the present embodiment to perform processing described below.

First, in step S101, memory for each variable to be used in the following steps is reserved in the RAM 204. Here, the set of simultaneous linear equations to be solved can be expressed as AX=b, where A is an M-by-N coefficient matrix, X is an M-by-1 variable matrix (variable vector), and b is a matrix representing the right-hand side of the M-by-1 variable matrix. Data related to the simultaneous linear equations is data of the coefficient matrix A and data of the matrix b on the right-hand side. The data related to the simultaneous linear equations and known parameters to be described below are loaded from the hard disk unit 205 to the RAM 204. Moreover, various variables to be used in the following steps are initialized. For example, a variable "t" (to which an iteration count is assigned) is reset to zero.

In step S102, a cycle of processing steps according to the CG method is performed once. In step S103, a minimum value $R_{MIN}$ of a residual $R_t$ is updated. When the variable t is zero (t=0), the minimum value $R_{MIN}$ is set to $R_0$ ($R_{MIN}=R_0$).

In step S104, values retained by a variable vector $X_{MIN}$ and an iteration count $t_{MIN}$ for the minimum value $R_{MIN}$ are temporarily stored in the RAM 204.

In step S105, a cumulative decrease amount $CRD_t$ and a cumulative increase amount $CRI_t$ are determined. The processing in step S105 will be described in detail below with reference to FIGS. 3 to 6.

Next, in step S106, it is determined on the basis of a convergence criterion condition for the CG method whether or not the calculation converges. If it is determined that the calculation converges (Yes in step S106), the processing ends. If it is determined that the calculation does not converge (No in step S106), the process proceeds to step S107. There is no particular restriction on how to determine whether or not the calculation converges, but it may be determined, for example, by a method predetermined on the basis of the iteration count or the norm of a residual vector.

If it is determined in step S106 that the calculation does not converge, a comparison is made in step S107 according to Inequality (1) below:

$$\epsilon CRD_t < CRI_t \tag{1}$$

where $\epsilon$ is a real positive number experientially determined. The cumulative decrease amount $CRD_t$ and the cumulative increase amount $CRI_t$ will be described below.

If the above-described comparison gives $\epsilon CRD_t \geq CRI_t$ (No in step S107), the process returns to step S102, where the variable t is incremented by one. Then, the subsequent steps are repeated.

On the other hand, if the comparison in step S107 gives $\epsilon CRD_t < CRI_t$ (Yes in step S107), that is, if it is determined that the calculation according to the CG method diverges, the process proceeds to step S108, where the initial value of the variable vector is set to $X_{MIN}$ and a calculation to solve the simultaneous linear equations is performed according to the CR method. Processing then ends.

The processing in step S105 will now be described in detail. The cumulative decrease amount $CRD_t$ and the cumulative increase amount $CRI_t$ described above are given as follows:

$$CRD_t = CRD_{t-1} + \max[(R_0 - R_t), 0] \tag{2}$$

$$CRI_t = CRI_{t-1} + \max[(R_t - R_{MIN}), 0] \tag{3}$$

where max (x, y) is a function that returns the larger of x and y.

Figure 4:
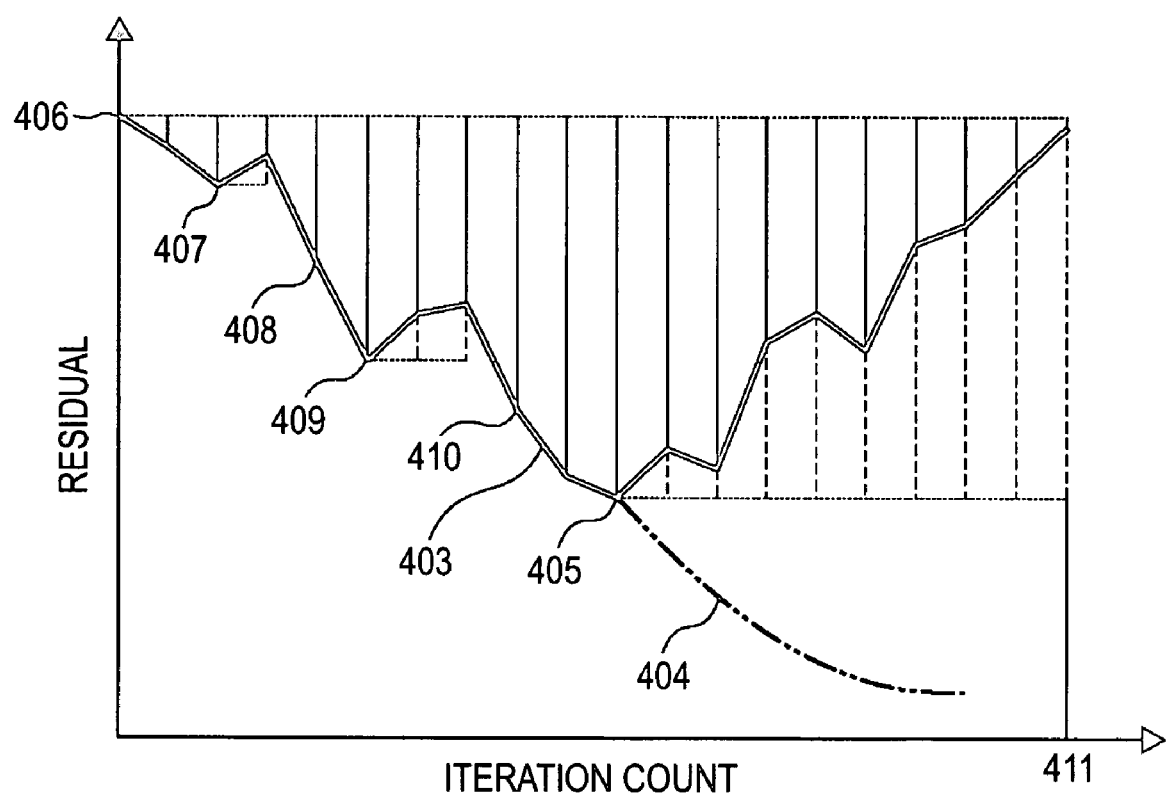
FIG. 4 shows an exemplary relationship between residuals and iteration counts in each of the CG and CR methods.

FIG. 4 shows an exemplary relationship between residuals and iteration counts in each of the CG and CR methods. As shown, the vertical axis represents residuals and the horizontal axis represents iteration counts. In FIG. 4, a solid line 403 shows changes in residual $R_t$ associated with an increase in iteration count during the calculations according to the CG method. A chain double-dashed line 404 shows changes in residual $R_t$ associated with an increase in iteration count during the calculations according to the CR method. A point 405 represents the minimum value $R_{MIN}$. The iteration count and the variable vector at the point 405 are represented by $t_{MIN}$ and $X_{MIN}$, respectively.

point 406 represents the initial residual $R_0$. A point 407 represents a temporary minimum value $R_{MIN}$ until a point 408 is reached, and a point 409 represents a temporary minimum value $R_{MIN}$ until a point 410 is reached. A point 411 represents an iteration count when it is determined that the calculation according to the CG method diverges. That is, FIG. 4 shows the case where Inequality (1) ($\epsilon CRD_t < CRI_t$) described above is satisfied.

Figure 3:
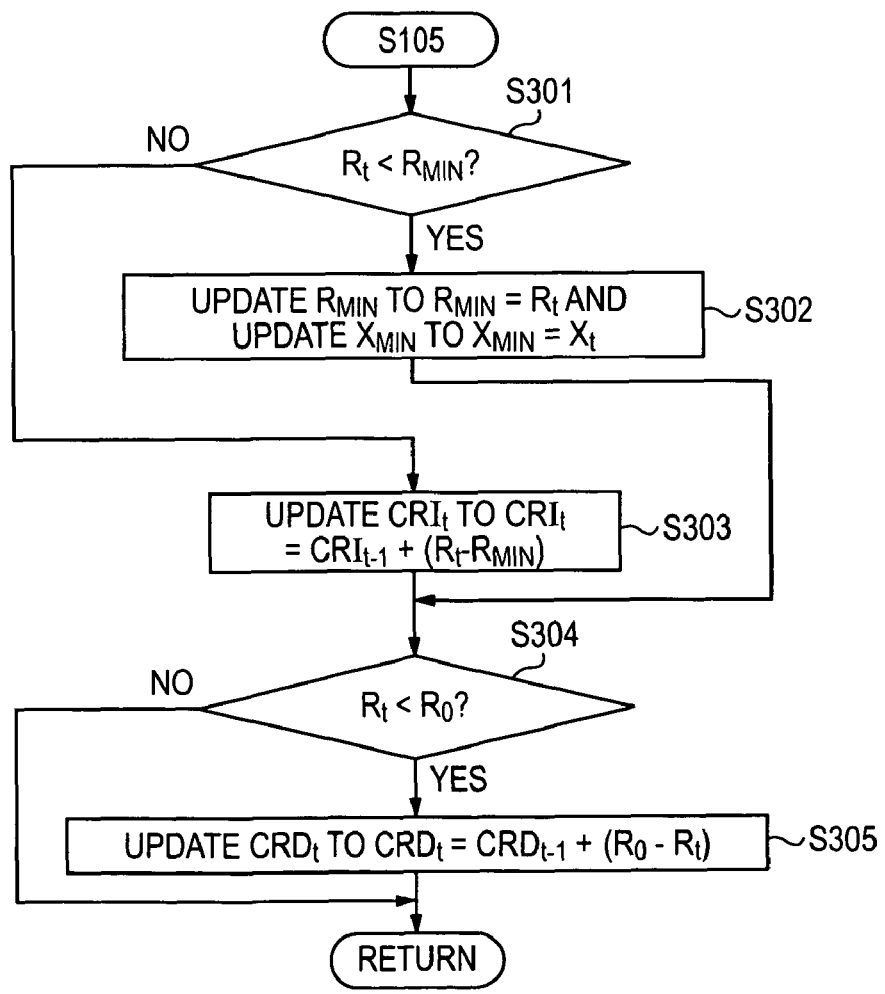
FIG. 3 is a flowchart showing an example of processing performed in step 105 of FIG. 1.

FIG. 3 is a flowchart showing the processing performed in step 105 of FIG. 1. First, it is determined in step S301 whether or not $R_t < R_{MIN}$ is satisfied. If it is determined that $R_t < R_{MIN}$ is satisfied (Yes in step S301), the process proceeds to step S302, where processing is performed according to Equations (4) and (5) below:

$$R_{MIN} = R_t \quad (4)$$

$$X_{MIN} = X_t \quad (5)$$

In FIG. 4, Equations (4) and (5) described above are satisfied in the sections from the point 406 to the point 407, from the point 408 to the point 409, and from the point 410 to the point 405. Upon completion of the processing in step S302, the process proceeds to step S304.

If it is determined in step S301 that $R_t \geq R_{MIN}$ is satisfied (No in step S301), the process proceeds to step S303, where the cumulative increase amount $CRI_t$ is updated by calculation according to Expression (6) below:

$$CRI_t = CRI_{t-1} + (R_t - R_{MIN}) \quad (6)$$

Upon completion of the processing in step S302 or step S303, the process proceeds to step S304, where it is determined whether or not $R_t < R_0$ is satisfied. If it is determined that $R_t < R_0$ is not satisfied, that is, $R_t \geq R_0$ is satisfied (No in step S304), the current processing in step S105 (shown in FIG. 3) ends and the process proceeds to step S106. If it is determined in step S304 that $R_t < R_0$ is satisfied (Yes in step S304), the process proceeds to step S305, where the cumulative decrease amount $CRD_t$ is updated by calculation according to Expression (7) below:

$$CRD_t = CRD_{t-1} + (R_0 - R_t) \quad (7)$$

After processing of step S305 is performed, the current processing in step S105 (shown in FIG. 3) ends and the process proceeds to step S106. Instead of Expressions (7) and (6) described above, the cumulative decrease amount $CRD_t$ and the cumulative increase amount $CRI_t$ may be updated, for example, as shown in Expressions (8) and (9) below:

$$CRD_t = CRD_{t-1} + \max[(R_0 - R_t), 0]/t \leq t_{MIN} \quad (8)$$

$$CRI_t = CRI_{t-1} + \max[(R_t - R_{MIN}), 0]/t_{MIN} < t \quad (9)$$

The following describes the case where the cumulative decrease amount $CRD_t$ and the cumulative increase amount $CRI_t$ are updated according to Expressions (8) and (9), respectively.

Figure 6:
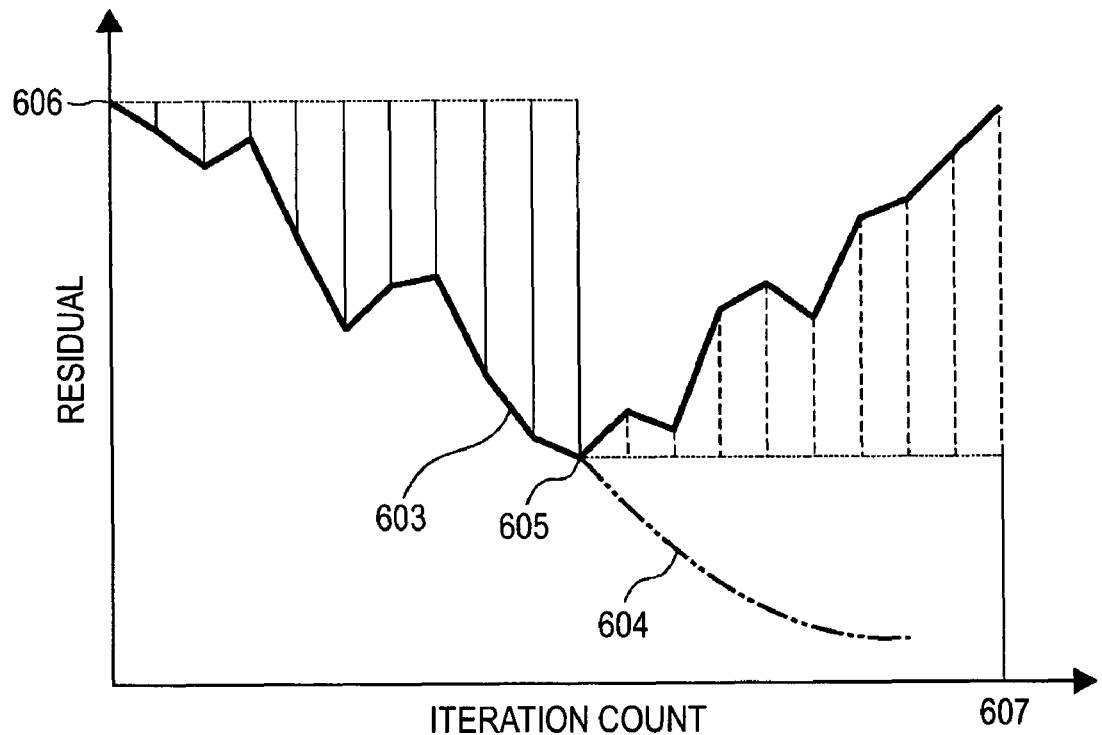
FIG. 6 shows another exemplary relationship between residuals and iteration counts in each of the CG and CR methods.

FIG. 6 shows the relationship between residuals and iteration counts in each of the CG and CR methods. As shown, the vertical axis represents residuals and the horizontal axis represents iteration counts. In FIG. 6, a solid line 603 shows changes in residual $R_t$ associated with an increase in iteration count during the calculations according to the CG method. A chain double-dashed line 604 shows changes in residual $R_t$ associated with an increase in iteration count during the calculations according to the CR method. A point 605 represents the minimum residual $R_{MIN}$. The iteration count and the variable vector at the point 605 are represented by $t_{MIN}$ and $X_{MIN}$, respectively.

A point 606 represents the initial residual $R_0$. A point 607 represents an iteration count when it is determined that the calculation according to the CG method diverges. That is, FIG. 6 shows the case where Inequality (1) ($\epsilon CRD_t < CRI_t$) described above is satisfied.

Figure 5:
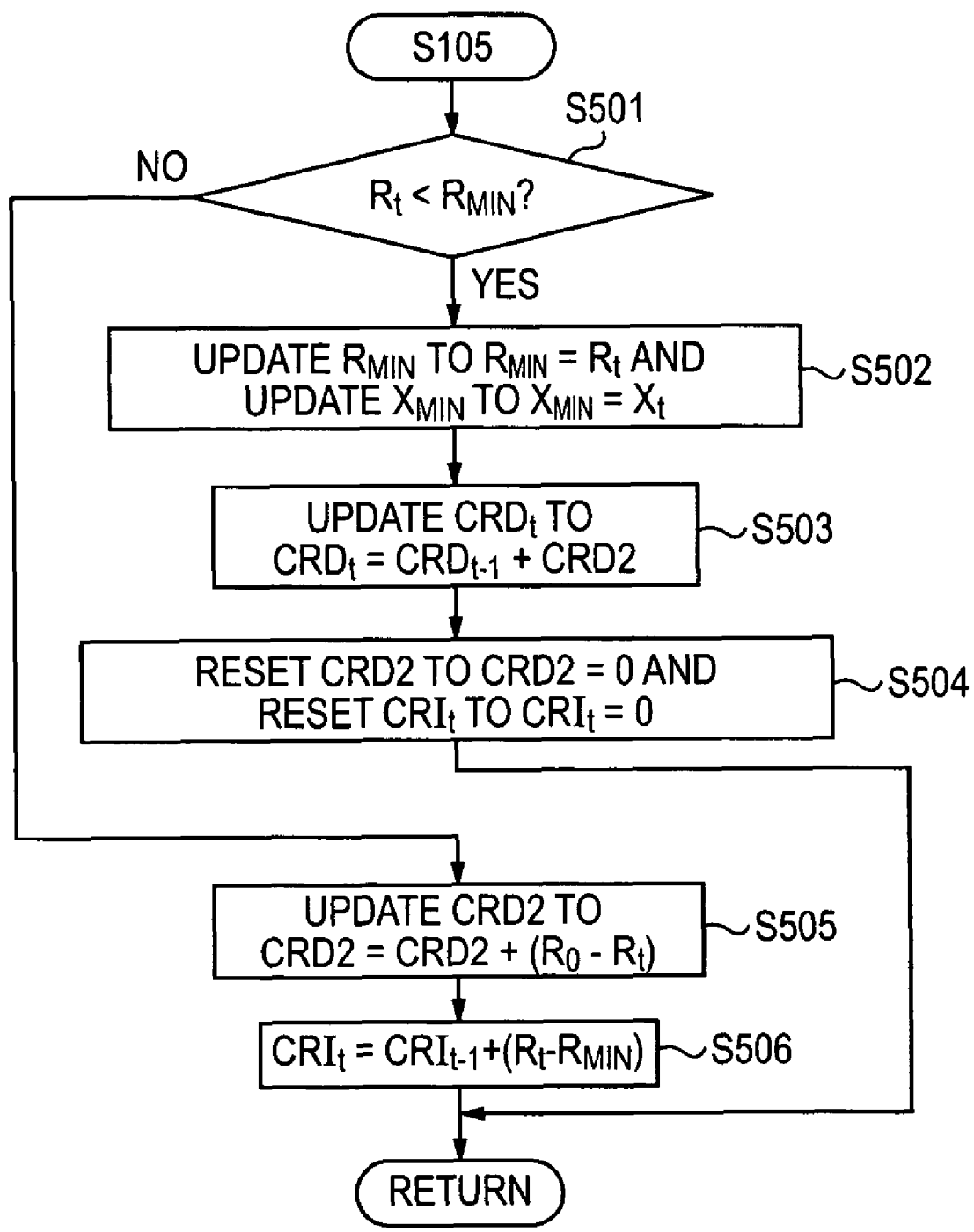
FIG. 5 is a flowchart showing another example of processing performed in step 105 of FIG. 1.

FIG. 5 is a flowchart showing the processing performed in step 105. First, it is determined in step S501 whether or not $R_t < R_{MIN}$ is satisfied. If it is determined that $R_t < R_{MIN}$ is satisfied (Yes in step S501), the process proceeds to step S502, where processing is performed according to Equations (4) and (5) described above.

Then, in step S503, the cumulative decrease amount $CRD_t$ is updated according to Expression (10) below:

$$CRD_t = CRD_{t-1} + CRD2 \quad (10)$$

where $CRD_0$ and CRD2 are reset to zero in step S101.

The process proceeds to step S504, where CRD2 and $CRI_t$ are reset to zero as follows:

$$CRD2 = 0 \quad (11)$$

$$CRI_t = 0 \quad (12)$$

The current processing of the flowchart in FIG. 5 then ends, and the process returns to step S106.

If it is determined in step S501 that $R_t < R_{MIN}$ is not satisfied, that is, $R_t \geq R_{MIN}$ is satisfied (No in step S501), the process proceeds to step S505, where CRD2 is updated according to Expression (13) below:

$$CRD2 = CRD2 + (R_0 - R_t) \quad (13)$$

In step S506, the cumulative increase amount $CRI_t$ is updated according to Expression (14) below:

$$CRI_t = CRI_{t-1} + (R_t - R_{MIN}) \quad (14)$$

Upon completion of the above-described processing, the processing shown in FIG. 5 ends and processing returns to step S106.

Figure 7:
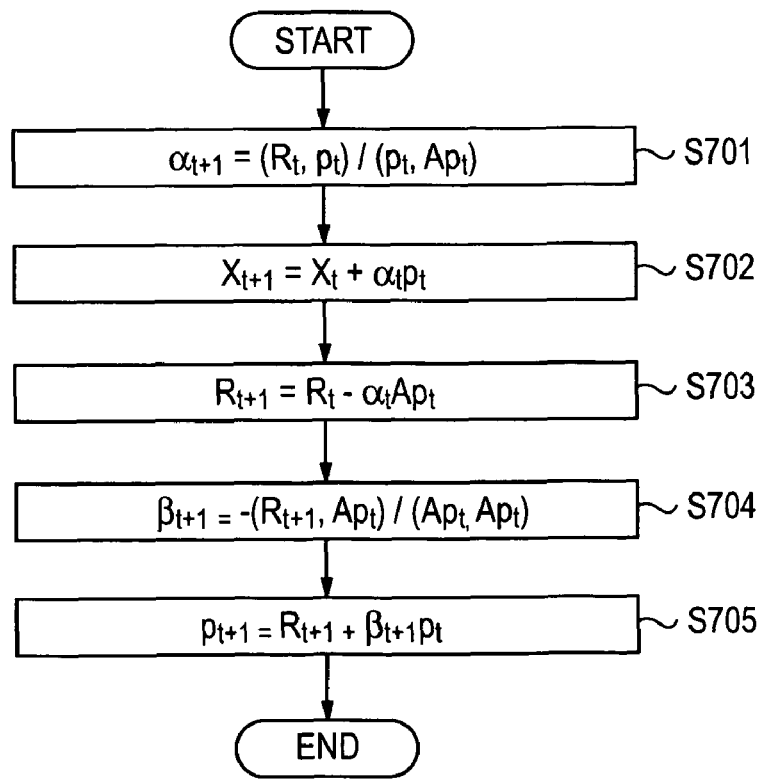
FIG. 7 is a flowchart showing an example of calculation performed according to the CG method.

Next, the CG method will be described. FIG. 7 is a flowchart of calculation (processing in step S102 of FIG. 1) performed according to the CG method. The flowchart in FIG. 7 shows one cycle of processing steps. This means, in practice, this cycle is repeated a plurality of times.

First, in step S701, an update coefficient $\alpha_t$ is determined according to Equation (15) below:

$$\alpha_{t+1} = (R_t, p_t)/(p_t, Ap_t) \quad (15)$$

Next, in step S702, the variable vector $X_t$ is updated according to Equation (16) below:

$$X_{t+1} = X_t + \alpha_t p_t \quad (16)$$

In step S703, the residual vector $R_t$ is updated according to Equation (17) below:

$$R_{t+1} = R_t - \alpha_t Ap_t \quad (17)$$

In step S704, an update coefficient $\beta_{t+1}$ of a search direction vector $p_t$ is determined according to Equation (18) below:

$$\beta_{t+1} = -(R_{t+1}, Ap_t)/(Ap_t, Ap_t) \quad (18)$$

Then, in step S705, the search direction vector $p_t$ is updated according to Equation (19) below:

$$p_{t+1} = R_{t+1} + \beta_{t+1} p_t \quad (19)$$

Figure 8:
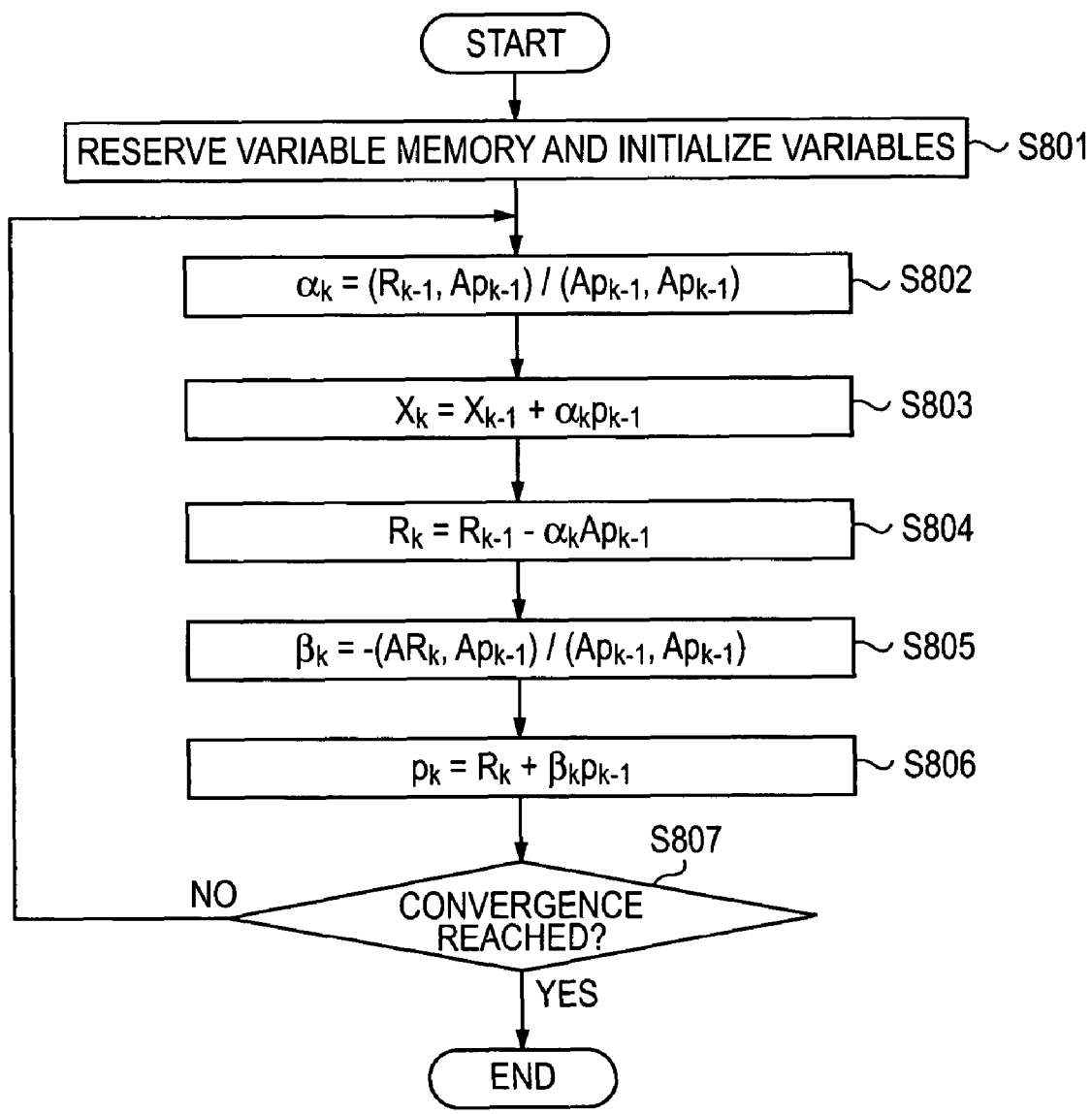
FIG. 8 is a flowchart showing another example of calculation performed according to the CR method.

The CR method will now be described. FIG. 8 is a flowchart of calculation (processing in step S108 of FIG. 1) performed according to the CR method. The flowchart in FIG. 8 shows one cycle of processing steps. This means, in practice, this cycle is repeated a plurality of times.

First, in step S801, memory for each variable to be used in the following steps is reserved in the RAM 204, and each variable is initialized. Examples of such a variable include a variable vector $X_k$, a displacement constraint condition B, and an evaluation function $L_1$.

As for the initialization of variables, for example, a variable vector X, a residual vector R, and a search direction vector p are initialized, and their initial values are represented by $X_0$, $R_0$, and $p_0$, respectively. Here, the initial value $X_0$ is set to $X_{MIN}$ ($X_0 = X_{MIN}$).

The initial value $R_0$ is determined using the initial value $X_0$ according to Equation (20) below:

$$R_k = b - AX_k \quad (20)$$

where b is a matrix (vector) of the right-hand side.

The initial value $p_0$ is equal to $R_0$. In the description of the present specification, a subscript "k" is added to a variable representing the value obtained by the k-th calculation. The variable k representing the iterative count is reset to zero.

Referring back to FIG. 8, in step S802, an update coefficient $\alpha_k$ of a state vector is determined according to Equation (21) below:

$$\alpha_k = (R_{k-1}, Ap_{k-1})/(Ap_{k-1}, Ap_{k-1}) \quad (21)$$

Next, in step S803, the variable vector $X_k$ is updated according to Equation (22) below:

$$X_k = X_{k-1} + \alpha_k p_{k-1} \quad (22)$$

In step S804, the residual vector $R_k$ is updated according to Equation (23) below:

$$R_k = R_{k-1} - \alpha_k Ap_{k-1} \quad (23)$$

In step S805, an update coefficient $\beta_k$ of the search direction vector $p_t$ is determined according to Equation (24) below:

$$\beta_k = -(AR_k, Ap_{k-1})/(Ap_{k-1}, Ap_{k-1}) \quad (24)$$

In step S806, the search direction vector $p_k$ is updated according to Equation (25) below:

$$p_k = R_k + \beta_k p_{k-1} \quad (25)$$

Then, in step S807, it is determined whether or not the calculation converges as a result of the processing described above. If it is determined that the calculation converges (Yes in step S807), the current processing ends. If it is determined that the calculation does not converge (No in step S807), the process returns to step S802 and the subsequent steps are performed again. There is no particular restriction on how to determine whether or not the calculation converges, but it may be determined, for example, by a method predetermined on the basis of the iteration count or the norm of a residual vector.

In step S102 (of FIG. 1) described above, a method derived from the CG method may be used. Similarly, in step S108, a method derived from the CR method may be used.

The CR method and various methods derived therefrom are disclosed, for example, in Hayami: "Convergence of GCR (k) method for singular systems (in Japanese)," Kyoto University Research Institute for Mathematical Sciences Kokyuroku 1265 (2002); Abe, Ogata, Sugihara, Zhang, and Mitsui: "Convergence of CR method for simultaneous linear equations with singular coefficient matrices (in Japanese)," Transactions of the Japan Society for Industrial and Applied Mathematics, Vol. 9, No. 1, pp. 1-13 (1999)); K. Hayami: "On the Behaviour of the Conjugate Residual Method for Singular Systems," NII Technical Report, NII-2001-002E (2002); and S-L. Zhang, Y. Oyanagi, and M. Sugihara: "Necessary and sufficient conditions for the convergence of Orthomin (k) on singular and inconsistent systems," Numerische Mathemarik, 87, pp. 391-405 (2000).

Thus, the configurations of the above-described embodiments allow a set of simultaneous linear equations to be solved even if it is not known whether or not its coefficient matrix is regular.

The present invention may be implemented when a recording medium (or storage medium) on which program code (software) for performing the functions of the above-described embodiments is recorded is supplied to a system or apparatus, and a computer (CPU or micro-processing unit (MPU)) in the system or apparatus reads and executes the program code stored in the recording medium. In this case, the program code itself implements the functions of the above-described embodiments.

The functions of the above-described embodiments are performed when a computer executes program code read from a recording medium. Moreover, the functions of the above-described embodiments are performed when an operating system (OS) running on the computer executes all or part of the actual processing on the basis of instructions of the program code.

The functions of the above-described embodiments are also performed when program code read from a recording medium is written to a memory of a function expansion card in a computer or to a memory of a function expansion unit connected to a computer, and then, a CPU or the like in the function expansion card or unit executes all or part of the actual processing on the basis of instructions of the program code.

When the present invention is applied to the recording medium described above, program code corresponding to the above-described flowchart is stored on the recording medium.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2004-363677 filed Dec. 15, 2004, which is hereby incorporated by reference herein in its entirety.

What is claimed is:

1. An information processing apparatus comprising:
a central processing unit operatively connected to the information processing apparatus, wherein the central processing unit comprises:
a first calculating unit configured to perform calculations based on a conjugate gradient method or a method derived therefrom;
a determining unit configured to determine, based on resulting data of a cumulative decreased amount $CRD_t$ and a cumulative increased amount $CRI_t$ obtained each time the first calculating unit iterates the calculations, where $CRD_t = CRD_{t-1} + \max[(R_o - R_t), 0]$, $CRI_t = CRI_{t-1} + \max[(R_t - R_{MIN}), 0]$, t is an iteration count, R is a residual value, whether the calculations diverge when $\epsilon CRD_t < CRI_t$ where $\epsilon$ is a real positive number; and
a second calculating unit configured to perform calculations based on a conjugate residual method or a method derived therefrom,
wherein the central processing unit terminates iteration of the calculations by the first calculating unit and initiates the calculations by the second calculating unit, if the determining unit determines that the calculations performed by the first calculating unit diverge.

2. The information processing apparatus according to claim 1, wherein the calculations are for obtaining solution data of a given set of simultaneous linear equations.

3. The information processing apparatus according to claim 2, wherein the second calculating unit is configured to update a minimum value $R_{MIN}$ of a residual; store a value $X_{MIN}$ of a state variable at the minimum value $R_{MIN}$; calculate a cumulative decrease CR- in residual from an initial value and a cumulative increase CR+ in residual from the minimum value $R_{MIN}$; and perform calculations, instead of the calculations performed by the first calculating method, according to the second calculating method using the value $X_{MIN}$ as an initial value when the cumulative decrease CR- and the cumulative increase CR+ satisfy a predetermined condition.

4. The information processing apparatus according to claim 3, wherein the cumulative decrease CR- represents the amount of decreases accumulated until the iteration count at which the minimum value $R_{MIN}$ occurs, while the cumulative increase CR+ represents the amount of increases accumulated from the iteration count at which the minimum value $R_{MIN}$ occurs.

5. An information processing method of causing an information processing apparatus to perform a plurality of calculations using a central processing unit operatively connected to the information processing apparatus, the method comprising:

a first calculating step of performing calculations based on a conjugate gradient method or a method derived therefrom performed in a first calculation unit associated with the central processing unit;

a determining step of determining, based on resulting data of a cumulative decreased amount $CRD_t$ and a cumulative increased amount $CRI_t$ obtained each time the first calculating step iterates the calculations, where $CRD_t = CRD_{t-1} + \max[(R_o - R_t), 0]$, $CRI_t = CRI_{t-1} + \max[(R_t - R_{MIN}), 0]$, t is an iteration count, R is a residual value, whether the calculations diverge when $\epsilon CRD_t < CRI_t$ where $\epsilon$ is a real positive number;

a second calculating step of performing calculations based on a conjugate residual method or a method derived therefrom performed in a second calculation unit associated with the central processing unit; and a step of terminating, using the central processing unit, iteration of the calculations in the first calculating step and initiating the calculations in the second calculating step, if it is determined that the calculations performed in the first calculating step diverge.

6. The information processing method according to claim 5, wherein the calculations are for obtaining solution data of a given set of simultaneous linear equations.

7. The information processing method according to claim 6, wherein the second calculating method updates a minimum value $R_{MIN}$ of a residual; stores a value $X_{MIN}$ of a state variable at the minimum value $R_{MIN}$; calculates a cumulative decrease CR- in residual from an initial value and a cumulative increase CR+ in residual from the minimum value $R_{MIN}$; and performs calculations, instead of the calculations performed by the first calculating method, according to the second calculating method using the value $X_{MIN}$ as an initial value when the cumulative decrease CR- and the cumulative increase CR+ satisfy a predetermined condition.

8. The information processing method according to claim 7, wherein the cumulative decrease CR- represents the amount of decreases accumulated until the iteration count at which the minimum value $R_{MIN}$ occurs, while the cumulative increase CR+ represents the amount of increases accumulated from the iteration count at which the minimum value $R_{MIN}$ occurs.

9. A computer-readable storage medium storing thereon a program for controlling a computer to perform the information processing method according to claim 5.

* * * * *